United States Patent
Wu et al.

(10) Patent No.: US 10,572,661 B2
(45) Date of Patent: Feb. 25, 2020

(54) AUTOMATED BLACKBOX INFERENCE OF EXTERNAL ORIGIN USER BEHAVIOR

(71) Applicant: NEC Laboratories America, Inc., Princeton, NJ (US)

(72) Inventors: Zhenyu Wu, Plainsboro, NJ (US); Jungwhan Rhee, Princeton, NJ (US); Yuseok Jeon, Princeton, NJ (US); Zhichun Li, Princeton, NJ (US); Kangkook Jee, Princeton, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 148 days.

(21) Appl. No.: 15/652,796

(22) Filed: Jul. 18, 2017

(65) Prior Publication Data
US 2018/0052995 A1    Feb. 22, 2018

Related U.S. Application Data

(60) Provisional application No. 62/375,589, filed on Aug. 16, 2016.

(51) Int. Cl.
| G06F 12/14 | (2006.01) |
| G06F 21/55 | (2013.01) |
| G06F 21/56 | (2013.01) |
| G06F 21/57 | (2013.01) |

(52) U.S. Cl.
CPC .......... *G06F 21/554* (2013.01); *G06F 21/566* (2013.01); *G06F 21/577* (2013.01); *G06F 2221/034* (2013.01)

(58) Field of Classification Search
None
See application file for complete search history.

(56) References Cited

U.S. PATENT DOCUMENTS

| 6,223,289 | B1 * | 4/2001 | Wall | G06F 21/31 |
| | | | | 709/227 |
| 7,203,962 | B1 * | 4/2007 | Moran | G06F 21/52 |
| | | | | 726/23 |
| 2005/0149726 | A1 * | 7/2005 | Joshi | G06F 21/51 |
| | | | | 713/164 |
| 2006/0095473 | A1 * | 5/2006 | Fox | G06Q 10/10 |

* cited by examiner

*Primary Examiner* — Brandon S Hoffman
(74) *Attorney, Agent, or Firm* — Joseph Kolodka

(57) ABSTRACT

Methods and systems for security analysis include determining whether a process has an origin internal to a system or external to the system using a processor based on monitored behavior events associated with the process. A security analysis is performed on only processes that have an external origin to determine if any of the processes having an external origin represent a security threat. A security action is performed if a process having an external origin is determined to represent a security threat.

18 Claims, 6 Drawing Sheets

AUTOMATED BLACKBOX INFERENCE OF EXTERNAL ORIGIN USER BEHAVIOR

RELATED APPLICATION INFORMATION

This application claims priority to 62/375,589 filed on Aug. 16, 2016, incorporated herein by reference herein its entirety.

BACKGROUND

Technical Field

The present invention relates to computer security and, more particularly, to automatic detection of events that occur due to external user actions.

Description of the Related Art

A modern computer system generally is operated by a large number of operating system processes, some belonging to interactive activities of a human user and introduced from outside the computer system, and others which are not interactive and have internal functions such as operating system background services and other automation software. External operations may originate, for example, in a shell command, a terminal program, or a graphical user interface.

The number of such processes is so high that it can be burdensome for security analyses to quickly locate high-risk, suspicious activities and attacks if all processes are inspected.

SUMMARY

A method for security analysis includes determining whether a process has an origin internal to a system or external to the system using a processor based on monitored behavior events associated with the process. A security analysis is performed on only processes that have an external origin to determine if any of the processes having an external origin represent a security threat. A security action is performed if a process having an external origin is determined to represent a security threat.

A system for security analysis includes a process filter module configured to determine whether a process has an origin internal to a system or external to the system based on monitored behavior events associated with the process. A security analysis module is configured to perform a security analysis on only processes that have an external origin to determine if any of the processes having an external origin represent a security threat. A security action module is configured to perform a security action if a process having an external origin is determined to represent a security threat.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention categorize operating system processes according to whether they originate from outside the system (or descend from such an event) or from inside the system. Processes having an external origin are considered to be higher risk because they represent channels by which an attack can be introduced, assuming the computer system starts in a clean state. By automating the categorization of processes that originate externally, a substantial amount of time and complexity can be saved by focusing on higher-risk events.

One approach to categorizing events is to categorize system authentication events as representing events with an external origin. Typically programs which grant an access to an external, incoming connection use authentication to determine whether the access has a proper credential. The present embodiments use events generated by the operating system for the purpose of authentication as one source of information for the categorization.

Another approach to categorizing events is based on the operating system properties for input/output (110) channels. Many programs involving communications with external entities have operating system properties regarding I/O channels. I/O properties indicate that a process has an input channel (e.g., a keyboard) and/or an output channel (e.g., a display) which are used for an interactive task or as a relay to a human when multiple processes are connected for an interactive task. The present embodiments use these operating system properties as another source of information for the categorization, as they indicate an interactive process with an external origin.

Figure 1:
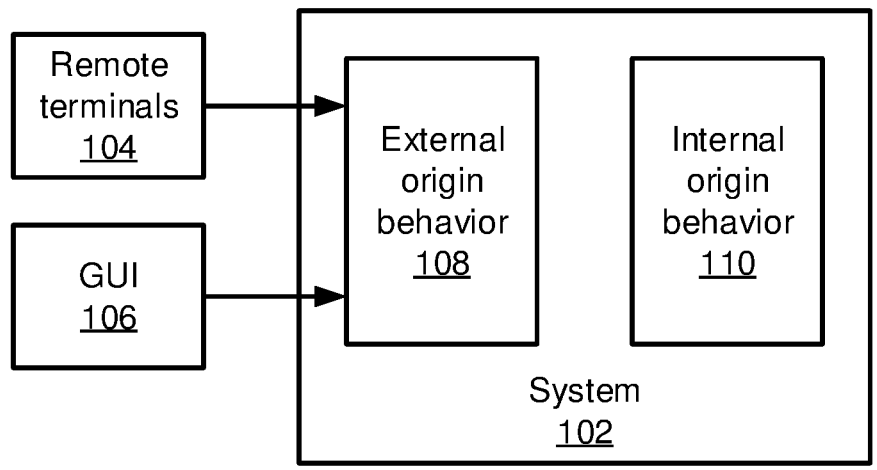
FIG. 1 is a block diagram illustrating the relationship between processes in a system having an external origin and processes having an internal origin in accordance with an embodiment of the present invention.

Referring now in detail to the figures in which like numerals represent the same or similar elements and initially to FIG. 1, the behavior of a system 102 is shown. The system 102 has external origin behavior 108 that is influenced by, e.g., remote terminals 104 and a graphical user interface 106. It should be understood that these external influencers are not an exhaustive list and that any appropriate data input may trigger external origin behavior 108 within the system 102. The external origin behavior 108 includes not only the processes and events triggered directly by the external influence, but also any subsequent processes or events that are triggered indirectly. The external origin behavior 108 therefore includes processes handling requests made by a user and any subsequent processes that descend from the initial interaction. Internal origin behavior 110, in contrast, represents those processes and events that occur without any influence from outside the system 102. Examples of internal origin behavior 110 include, e.g., operating system services and automatically started server programs.

Figure 2:
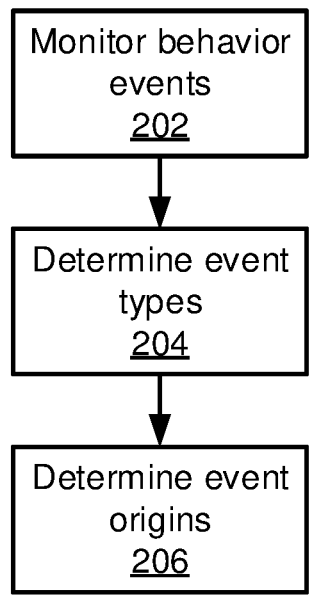
FIG. 2 is a block/flow diagram of a method for determining the origin of an event in accordance with an embodiment of the present invention.

Referring now to FIG. 2, a method for categorizing event origins is shown. Block 202 monitors behavior events relating to an input program. An event (also referred to herein as a behavior event) represents the behavior of a process. As a process runs, it generates a series of behavior events that block 202 collects. The events represent various kinds of behavior including, for example, starting or stopping a child process or thread; loading a new program; opening, closing, reading, and writing files; or connecting to a network and transferring information to or from the network. Block 204 breaks the events down into different types, including, for example, authentication events, process behavior events, and other behavior events. Block 204 also determines properties of the events and processes such as, e.g., I/O channel properties.

For each event, block 204 checks a field provided by the operating system that shows what kind of operation the event represents. Each event has a field showing, for example, whether it is a process creation event or some other kind of event. The events can then be categorized, providing a mapping from each event's specific label (e.g., a process creation event) to the event's type (e.g., a process event).

Block 206 then determines whether each event originated internally or externally. Block 206 categorizes processes and events into a list of sessions that are represented as session behavior records based on, e.g., the factors described below. A first output is provided as a list of external origin (EO) behavior sessions, where each EO session represents a collection of processes that started from an external connection. The second output is the internal origin session which includes a collection of processes that started internally.

A "process" (e.g., an operating system process) is used herein to refer to a running instance of a program (i.e., a program can be executed multiple times and each case becomes a unique process). The process generates a collection of one or more related events. The present embodiments store all monitored events (also known as behavior events) along with other properties of the process as a process behavior record, with the following representing an exemplary format for such a record:
1. Process name
2. Process ID
3. Parent ID
4. Program image
5. List of libraries
6. List of behavior events
Process start event
. . .
Other events such as I/O and network events
. . .
Process end event The list of behavior events for a process behavior record begins with an initiating event and continues to a terminating event. Every event initiated that descends from the initiating event is included in the list, including file I/O events and network events.

A session is defined herein as a collection of multiple relevant processes' behavior. An external origin behavior session is a collection of processes' behavior where the initiating process has an origin that is external to the system. The external origin behavior session further includes any descendent processes from the initiating process. An internal origin behavior session is a collection of processes which do not belong to any external origin behavior session.

A session may be represented as a tree data structure, with each node of the tree being represented as a process behavior record. The first process, which decides whether the session is internal or external, is designated the root process. The root process's behavior is the root node of the tree, and children processes of the root process become child nodes of the root node in the tree. Any further process behavior from the root process is collected together as a group and is represented as a session behavior record.

Each individual entrance behavior caused by an external connection is represented as a separate external origin session. The set of processes that do not belong to any external origin session belong to the internal origin session. A session may have multiple roots if a process that is joined later does not have its parent in the session. The internal origin session therefore may have many root nodes.

Figure 3:
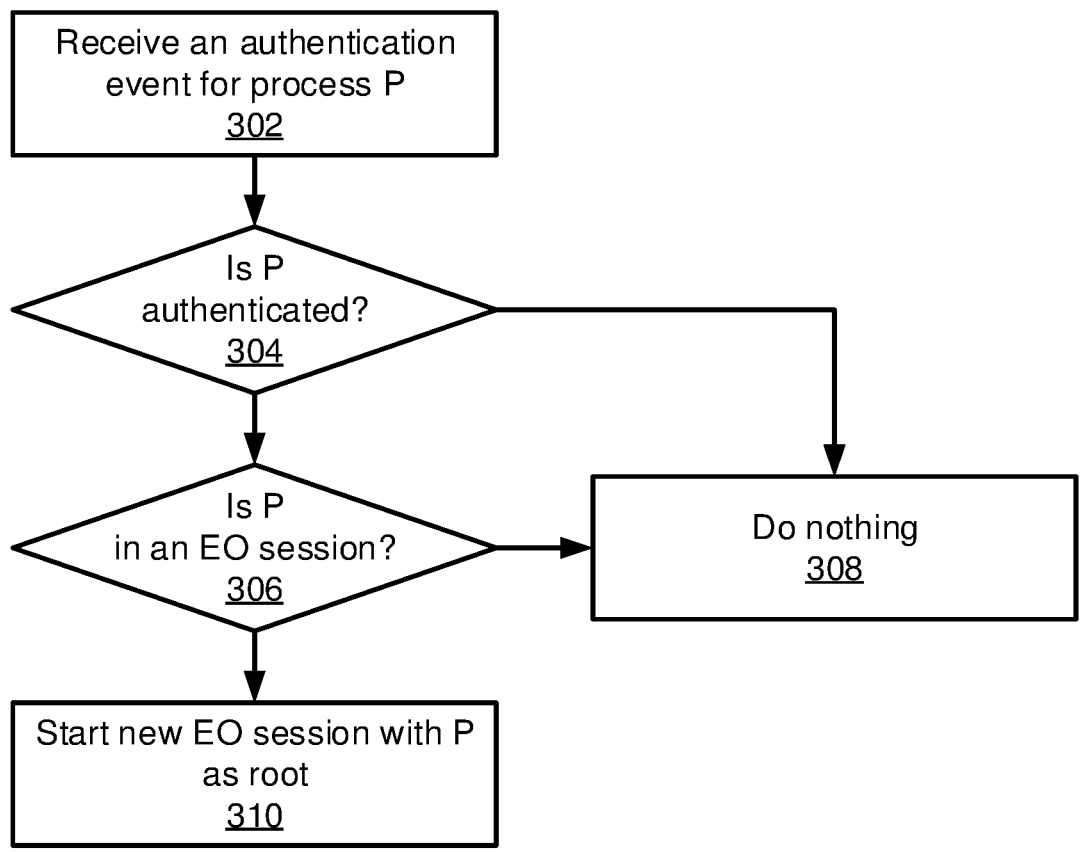
FIG. 3 is a block/flow diagram of a method for determining the origin of a process having an authentication event in accordance with an embodiment of the present invention.

Referring now to FIG. 3, a method for inferring the origin of a process with authentication events is shown. Block 302 receives an authentication event for a process P. When block 204 determines that the process P includes an authentication event (e.g., a log-in attempt with a password), it invokes block 302 (discussed below) with the identification of the process P and the authentication event as parameters. An authentication event may have an associated result that is, e.g., authentication success or failure. Block 304 determines whether the process P is successfully authenticated. If authentication failed, processing for process P terminates at block 308.

If authentication was successful, block 306 determines whether the process P already exists inside any external origin (EO) session. If so, for example if the process P is a child process of some other process that has already been determined to have an external origin, processing terminates at block 308. If the authenticated process P is not already in an EO session, block 310 creates a new EO session with the process P as the root. Any child of the process P will then be added to the new EO session as children of the root process.

Figure 4:
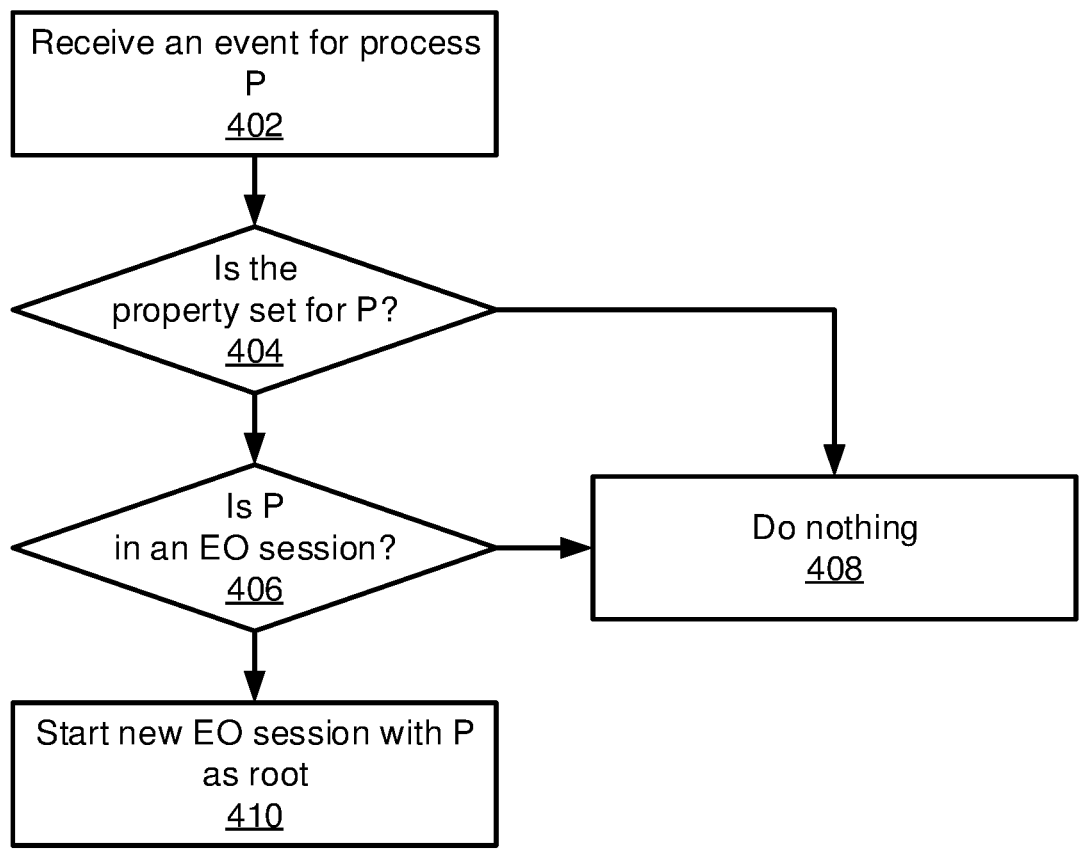
FIG. 4 is a block/flow diagram of a method for determining the origin of a process having an input/output channel property in accordance with an embodiment of the present invention.

Referring now to FIG. 4, a method for inferring the origin of a process with an I/O channel property is shown. Each event in the process P may have an I/O property set. Block 204 invokes block 402 for every event with the identification of the process P and the I/O channel property as parameters. Block 402 receives an event for a process P. Block 404 determines whether the I/O channel property is set for the received event. If the I/O channel property is not set, block 408 terminates processing for the process P.

If the I/O channel property is set for an event in the process P, block 406 determines whether the process P already exists inside any external origin (EO) session. If so, for example if the process P is a child process of some other process that has already been determined to have an external origin, processing terminates at block 408. If the authenticated process P is not already in an EO session, block 410 creates a new EO session with the process P as the root. Any child of the process P will then be added to the new EO session as children of the root process.

Another way to infer the origin of a process P is to use process events. Process events are used to set relationships between parent and child processes. There are five types of process events described herein, but it should be understood that the present embodiments may be extended to include any event that governs the relationship between parent and child processes.

A process create event is an event in a first process P1 that creates a new process P2. The process create event includes information regarding the first process P1 and the new process P2. The present embodiments thus check whether P1 exists in an EO session and, if so, puts P2 in the same EO session as a child of P1. If P1 does not belong to any EO session, then it is inferred that P1 belongs to the internal origin session, and P2 is inserted to the internal origin session as a child of P1.

Process exec events and process library events are events belonging to a process P that loads, respectively, an executable binary E1 or a library L1 into its execution state. For these types of events, the present embodiments update the process behavior record of P with the newly loaded E1 or L1.

A process end event is an event terminates a process P and includes information regarding how children of the process P are handled. In a process end event, the corresponding process behavior record for P is removed from its session. Any children to P are updated in their process behavior records in accordance with how those processes are to be handled. The child processes of P are then removed as well, unless those processes are provided new parents in the process end event. In such a case, the child processes are moved to the appropriate session and their corresponding process behavior records are updated.

A process update event belongs to a child process P2 and updates a parent process P1. In a process update event, the process behavior records are found in their session and are updated.

When events other than those described above are recorded for a process P, the process behavior record for the process P is updated to include the events. The present embodiments may be extended to make inferences regarding the origin of the process P based on such other events if the information that they include is determined to be predictive.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
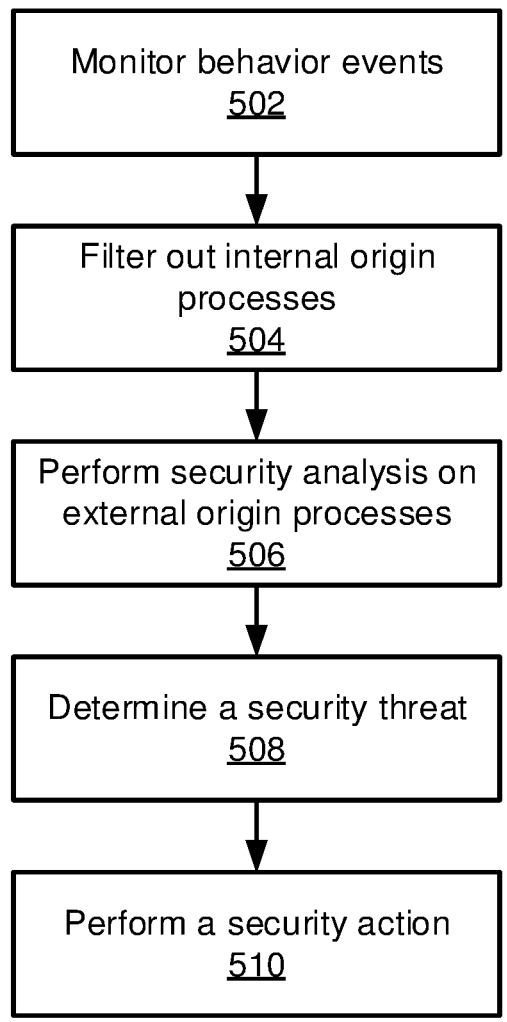
FIG. 5 is a block/flow diagram of a method for performing security threat detection in accordance with an embodiment of the present invention.

Referring now to FIG. 5, a system security method is shown. Block 502 monitors behavior events that may include, for example, operating system behavior events, user events, file I/O events, authentication events, process events, and any other type of event having an internal or external origin. Block 504 then filters out the internal origin events and processes using, e.g., the methods discussed above with respect to blocks 204 and 206 and the associated origin inferences.

After filtering the events to remove the internal origin processes and events, the remaining external origin sessions represent events and processes that pose a heightened security risk. Block 506 performs a security analysis on the external origin sessions using any appropriate security analysis process. For example, block 506 may employ domain knowledge and/or machine learning techniques to automatically detect when a given event or process represents a security threat. In one embodiment, block 506 determines a threat score for each session representing a degree of the security threat posed by the session.

Block 508 determines whether a particular external origin session is a security threat by, e.g., comparing the threat score to a threshold. It should be understood that this is just one way to determine whether a given session represents a security threat and that any other process for making that determination may be used instead. If a session is determined to represent a security threat, block 510 performs a security action. Such a security action may include, e.g., alerting a system administrator, generating a report of the security threat, automatically adjusting security settings (e.g., including a system security level or sensitivity), terminating a connection, process, or session, etc.

Figure 6:
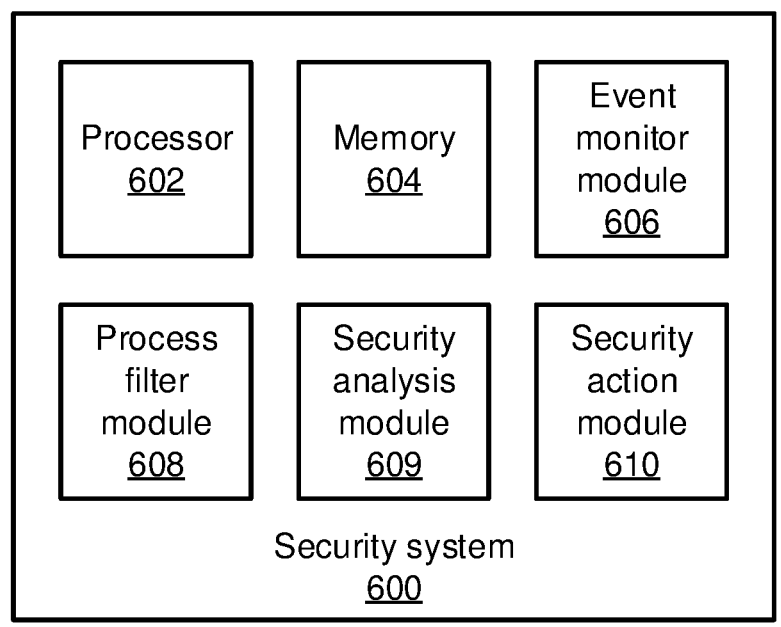
FIG. 6 is a block diagram of a system for performing security threat detection in accordance with an embodiment of the present invention.

Referring now to FIG. 6, a security system 600 is shown. The system 600 includes a hardware processor 602 and a memory 604. The system 600 further includes one or more functional modules that may, in some embodiments, be implemented as software that is stored in the memory 604 and executed by the hardware processor 602. In other embodiments, functional modules may be implemented as one or more discrete hardware components in the form of, e.g., application specific integrated chips or field programmable gate arrays.

An event monitor module 606 makes a record of behavior events. These events may include, for example, system calls by software or the operating system, file I/O events, network events, process events, etc. The output of the event monitor module 606 is stored in the form of, e.g., process behavior records as described above. Process filter module 608 determines whether each process has an external origin or an internal origin and creates corresponding sessions from the processes.

Security analysis module 609 performs a security analysis of the sessions that have an external origin, omitting the internal origin session. In so doing, the security analysis module 609 skips processes that are likely to be safe and focuses on processes that have a heightened likelihood of security risks. If the security analysis module 609 determines that a particular event, process, or session represents a security threat, security action module 610 performs an appropriate security action to report, counter, and/or mitigate the risk.

Figure 7:
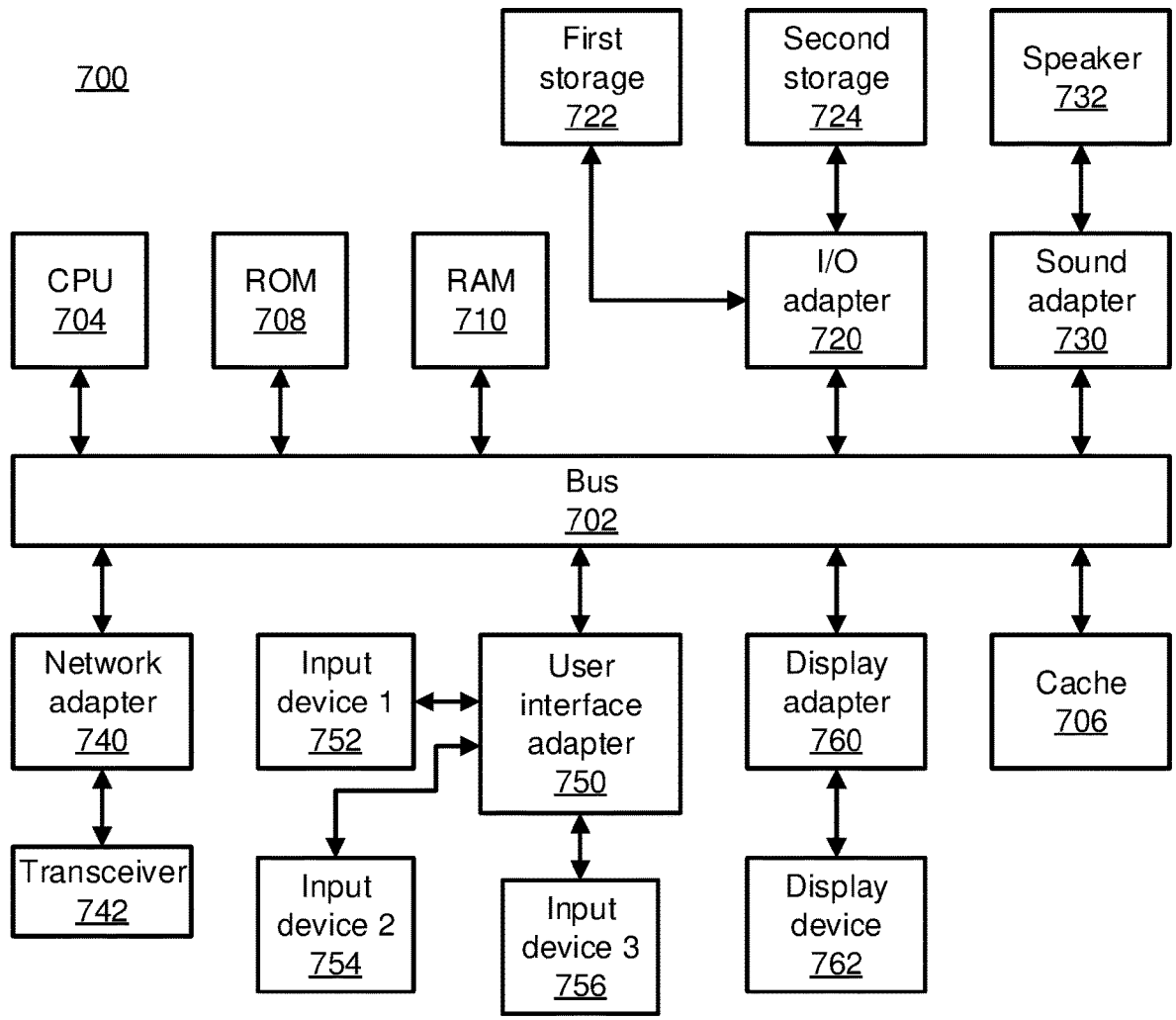
FIG. 7 is a block diagram of a processing system in accordance with an embodiment of the present invention.

Referring now to FIG. 7, an exemplary processing system 700 is shown which may represent the security system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for security analysis, comprising:
   determining that a process, which is executed on a system, has an origin external to the system using a processor based on monitored behavior events associated with the process, by determining that the process is initiated by an action external to the system or is descended from a process that is initiated by an actin external to the system;
   determining that the process represents a security threat by a security analysis; and
   performing a security action responsive to the determination that the process represent a security threat.

2. The method of claim 1, wherein determining that a process has an origin external to the system comprises determining an event type for each monitored behavior event associated with the process.

3. The method of claim 2, wherein determining that a process has an origin external to the system further comprises adding the process to an external origin session responsive to a determination that the process is associated with a successful authentication event.

4. The method of claim 2, wherein determining that a process has an origin external to the system further comprises adding the process to an external origin session responsive to a determination that the process has an input/output property set.

5. The method of claim 2, wherein determining that a process has an origin external to the system further comprises adding the process to an external origin session responsive to a determination that the process was created by a process in the external origin session.

6. The method of claim 1, wherein determining that a process has an origin external to the system comprises adding each process to one of an internal origin session or an external origin session.

7. The method of claim 6, wherein determining that a process has an origin external to the system further comprises adding all processes that do not belong to an external origin session to a shared internal origin session.

8. The method of claim 6, wherein each external origin session is organized as a process tree.

9. The method of claim 8, wherein an initiating process is a root node of a process tree and wherein every child process of the initiating process is a child node of the process tree.

10. A system for security analysis, comprising:
    a process filter module configured to determine whether a process, which is executed on a system, has an origin external to the system based on monitored behavior events associated with the process, and to determine that a process has an origin external to the system if the process is initiated by an action external to the system or if the process is descended from a process that is initiated by an action external to the system;
    a security analysis module configured to perform a security analysis on only processes that have an external origin to determine if any of the processes having an external origin represent a security threat;

a security action module configured to perform a security action if a process having an external origin is determined to represent a security threat.

11. The system of claim 10, wherein the process filter module is further configured to determine an event type for each monitored behavior event associated with the process.

12. The system of claim 11, wherein the process filter module is further configured to add the process to an external origin session if the process is associated with a successful authentication event.

13. The system of claim 11, wherein the process filter module is further configured to add the process to an external origin session if the process has an input/output property set.

14. The system of claim 11, wherein the process filter module is further configured to add the process to an external origin session if the process was created by a process in the external origin session.

15. The system of claim 10, wherein the process filter module is further configured to add each process to one of an internal origin session or an external origin session.

16. The system of claim 15, wherein the process filter module is further configured to add all processes that do not belong to an external origin session to a shared internal origin session.

17. The system of claim 15, wherein each external origin session is organized as a process tree.

18. The system of claim 17, wherein an initiating process is a root node of a process tree and wherein every child process of the initiating process is a child node of the process tree.

* * * * *